(12) United States Patent
Chen et al.

(10) Patent No.: US 11,569,768 B2
(45) Date of Patent: Jan. 31, 2023

(54) GENERATOR CONTROL SYSTEM AND METHOD OF CONTROLLING THE SAME

(71) Applicant: DELTA ELECTRONICS, INC., Taoyuan (TW)

(72) Inventors: Chin-Hao Chen, Taoyuan (TW); Cheng-Chung Li, Taoyuan (TW); Hung-Hsing Chiang, Taoyuan (TW); Chieh-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/353,164

(22) Filed: Jun. 21, 2021

(65) Prior Publication Data

US 2022/0131487 A1    Apr. 28, 2022

(30) Foreign Application Priority Data

Oct. 26, 2020    (CN) .......................... 202011154668.3

(51) Int. Cl.
| | | |
|---|---|---|
| *H02P 7/00* | (2016.01) | |
| *H02P 9/08* | (2006.01) | |
| *H02P 9/00* | (2006.01) | |
| *H02P 9/02* | (2006.01) | |
| *H02P 101/25* | (2016.01) | |

(52) U.S. Cl.
CPC ................ *H02P 9/08* (2013.01); *H02P 9/009* (2013.01); *H02P 9/02* (2013.01); *H02P 2101/25* (2015.01)

(58) Field of Classification Search
CPC ........ H02P 9/08; H02P 2101/25; H02P 9/009; H02P 9/02
See application file for complete search history.

(56) References Cited

FOREIGN PATENT DOCUMENTS

| | | | | |
|---|---|---|---|---|
| CN | 106062287 A | * | 10/2016 | ............. B60K 25/02 |
| JP | 2010162996 A | | 7/2010 | |
| JP | 2011089327 A | | 5/2011 | |
| JP | 2012175801 A | | 9/2012 | |

* cited by examiner

*Primary Examiner* — Karen Masih
(74) *Attorney, Agent, or Firm* — Muncy, Geissler, Olds & Lowe, P.C.

(57) ABSTRACT

A generator control system is coupled to a motor generator. The system includes a DC port, a first switch unit, a DC bus, a first power conversion circuit, a second power conversion circuit, and a second switch unit. The first power conversion circuit has a first side coupled to the DC bus and a second side coupled to the first switch unit. The second power conversion circuit has a first side coupled to the DC bus and a second side coupled to the motor generator. One end of the second switch unit is coupled to the first power conversion circuit and the first switch unit, and the other end of the second switch unit is coupled to the DC port.

15 Claims, 6 Drawing Sheets

GENERATOR CONTROL SYSTEM AND METHOD OF CONTROLLING THE SAME

BACKGROUND

Technical Field

The present disclosure relates to a generator control system and a method of controlling the same, and more particularly to a control system and a method of controlling the same for starting and supplying power to a motor generator.

Description of Related Art

The statements in this section merely provide background information related to the present disclosure and do not necessarily constitute prior art.

For traditional portable generator systems, users usually start the engines of the generator systems by pulling a pull cord with a handle. In recent years, portable generators with starter buttons providing a more convenient way to start the engines have gradually become the mainstream of the market, and DC brush motors are usually used as power starting systems for starting the engine. However, due to some disadvantages of DC brush motors, such as loud nose, easy damage, and space occupation, portable generator system manufacturers tend to develop and use integrated starter generator (ISG) systems. That is, the generator of the integrated starter generator system is used as an electric motor to drive the engine when the generator is in the starting phase so as to replace the DC brush motor used in the traditional generator system. Therefore, how to effectively implement the ISG system into the current generator systems has become the direction of technical competition among manufacturers.

FIG. 1 shows an exemplary traditional ISG system, which uses an independent three-phase full-bridge conversion circuit 500 to realize the function of starting the motor generator 200 by connecting a battery 300 to the motor generator 200 through three relay devices R with relatively higher voltage and higher current specifications (such as 300Vac, 45A) than general motor generator systems. Although the control of this circuit structure is relatively simple, it has the following disadvantages.

1. High-voltage batteries are required: Since the battery 300 is directly connected to the three-phase full-bridge conversion circuit 500 as a power source to start the motor generator 200, the battery 300 needs to be a relatively high-voltage battery. For example, a 48-volt battery 300 is generally used to meet the ignition speed requirements of the engine without modifying the generator specifications. A relatively low-voltage battery (such as 12 volts) would fail to start the motor generator 200 due to the insufficient voltage.

2. Relays with higher rating specifications are required: After the engine is started, since the AC voltage generated by the generator will exceed the component ratings of the three-phase full-bridge circuit 500, and the charging safety of the battery 300 may also be affected by the three-phase AC currents flowing through the junction diodes of the three-phase full-bridge circuit 500, three relatively high-voltage/high-current relay devices R are required to satisfy the isolation requirements between the battery 300, the three-phase full-bridge circuit 500, and the motor generator 200 after the engine is started.

3. System design is less flexible: Since the system specifications such as power generation voltage, engine starting voltage, and battery voltage need to match each other, and the battery 300 with fixed voltage is directly connected to the three-phase full-bridge circuit 500, the system design of the motor generator 200 is less flexible.

4. High cost: The traditional ISG system requires additional three-phase full-bridge conversion circuit 500, the three relatively high voltage/high current relay devices R, a start switch (not shown) connected to the battery 300 and a control unit (not shown) to achieve the starting function, which means that a large number of switches, larger-sized devices and the higher-voltage battery 300 with higher cost will be added, increasing the component costs and also impacting the overall cost.

Therefore, how to design a generator control system and a method of controlling the same to solve the above-mentioned disadvantages of the traditional ISG system, to reduce circuit cost and system size, and successfully implement the operations of generator start-up and power generation, is an important subject researched by inventors of the present disclosure.

SUMMARY

An object of the present disclosure is to provide a generator control system to solve the above-mentioned problems.

The generator control system of the present disclosure is coupled to a motor generator. The generator control system includes a DC port configured to receive a DC voltage, a first switch unit, a DC bus, a first power conversion circuit, a second power conversion circuit, and a second switch unit. The first power conversion circuit has a first side coupled to the DC bus and a second side coupled to the first switch unit. The second power conversion circuit has a first side coupled to the DC bus and a second side coupled to the motor generator. A first end of the second switch unit is coupled to the first power conversion circuit and the first switch unit, and a second end of the second switch unit is coupled to the DC port.

Another object of the present disclosure is to provide a method of controlling a generator control system to solve the above-mentioned problems.

In order to achieve the above-mentioned object, the generator control system coupled to a motor generator includes a DC port for receiving a DC voltage, a first switch unit, a DC bus, a first power conversion circuit, a second power conversion circuit, and a second switch unit. The method includes steps of: (a) turning off the first switch unit and turning on the second switch unit when a bus voltage on the DC bus is less than or equal to a first threshold value, (b) controlling a first bridge arm of the first power conversion circuit to convert the DC voltage into the bus voltage, or controlling a second bridge arm connected in parallel with the first bridge arm to convert the DC voltage into the bus voltage, and (c) controlling the second power conversion circuit to convert the bus voltage into a second AC voltage to drive the motor generator.

Accordingly, the generator control system is provided to utilize the existing first power conversion circuit with bidirectional conversion function in the system to boost the DC voltage provided by the battery into the bus voltage, so as to eliminate the use of the high voltage/high current relays and the high-voltage battery used in the traditional ISG system, thereby significantly reducing the size of the generator control system, for example, reducing the size of the battery, and reducing the size of switches by replacing the relays with transistor switches.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
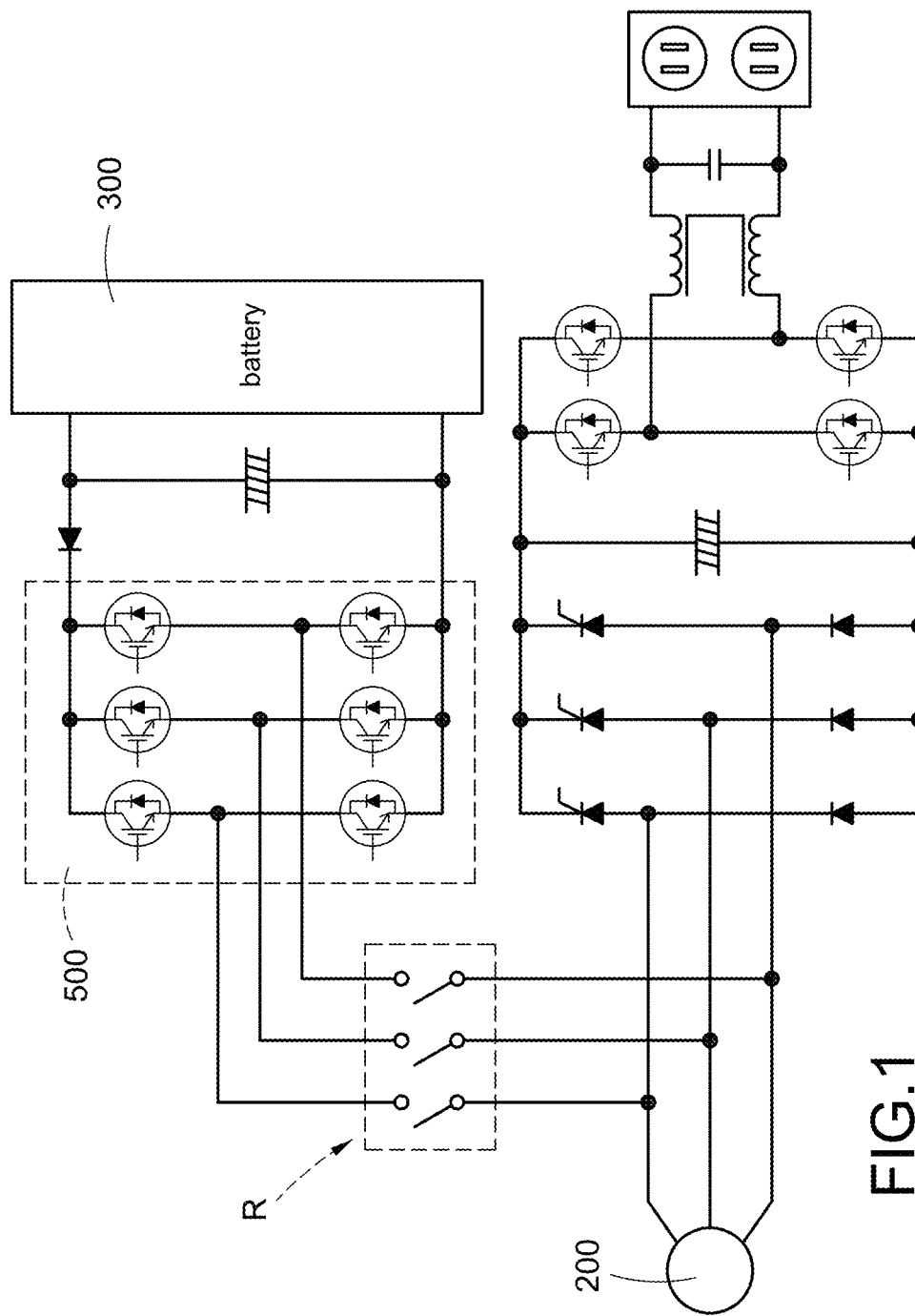
FIG. 1 is a circuit diagram of a traditional ISG system.

Reference will now be made to the drawing figures to describe the present disclosure in detail. It will be understood that the drawing figures and exemplified embodiments of present disclosure are not limited to the details thereof.

Figure 2:
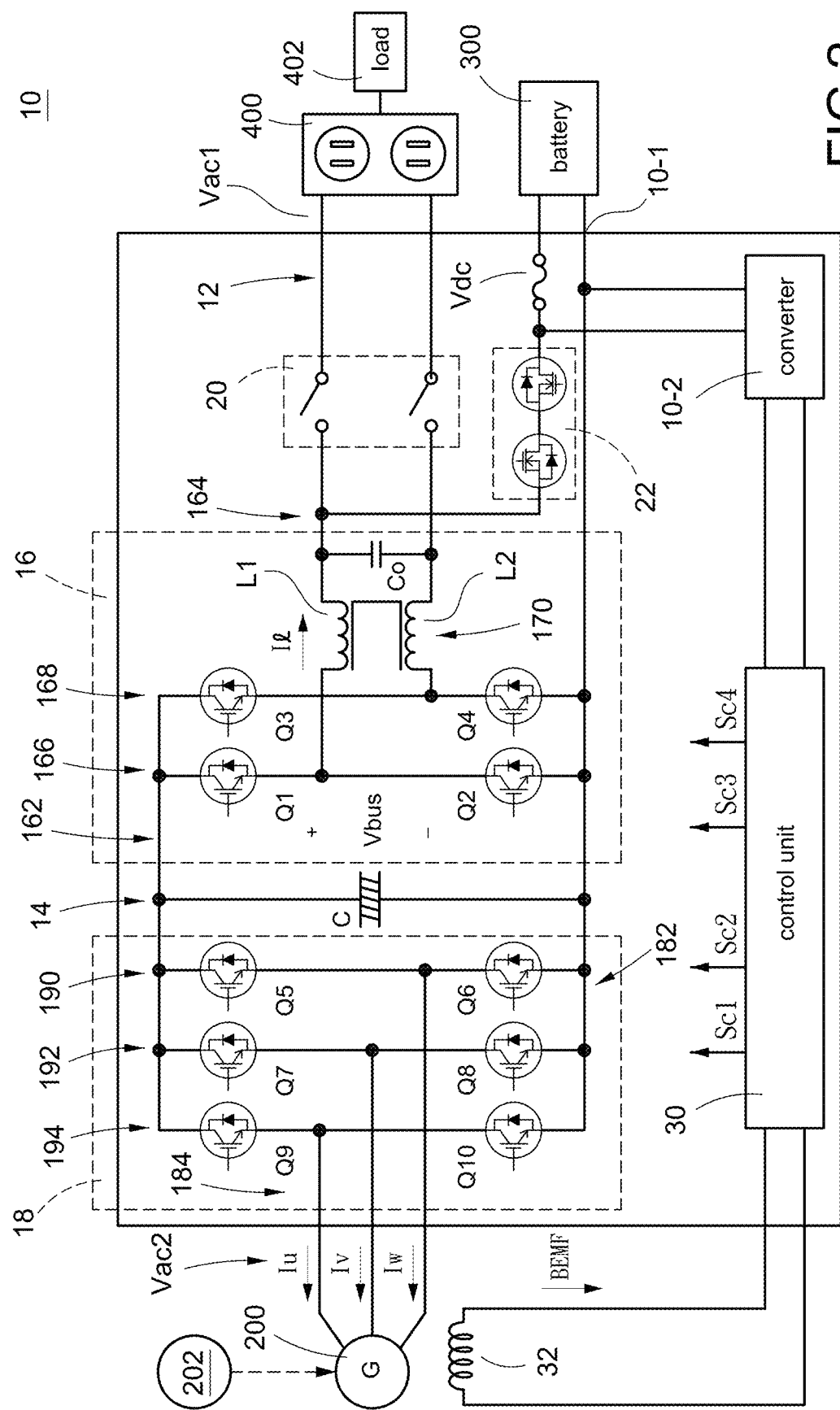
FIG. 2 is a circuit diagram of an exemplary generator control system according to the present disclosure.

FIG. 2 illustrates a circuit diagram of an exemplary generator control system according to the present disclosure. A first end of the generator control system 10 is coupled to an integrated starter generator (ISG) 200 (hereinafter "motor generator 200"), a second end of the generator control system 10 is coupled to a battery 300, and a third end of the generator control system 10 is coupled to an AC output port 400. The motor generator 200 is coupled to an engine 202. The motor generator 200 starts the engine 202 by a motor-driven manner, and after the engine 202 is started, the motor generator 200 is driven by the engine 202 to generate electricity as a generator.

In a start mode of the generator control system 10, the battery 300 supplies power to drive the motor generator 200 so that the motor generator 200 starts the engine 202. In a power generation mode after the engine 202 is started, the engine 202 drives the motor generator 200 so that the motor generator 200 provides a second AC voltage Vac2 to the generator control system 10. The generator control system 10 converts the second AC voltage Vac2 into a first AC voltage Vac1 and provides the first AC voltage Vac1 to the AC output port 400 for supplying power to a load 402 coupled to the AC output port 400.

The generator control system 10 includes a power output path 12 coupled to the AC output port 400, a DC bus 14, a first power conversion circuit 16, a second power conversion circuit 18, a first switch unit 20, a second switch unit 22, and a control unit 30. The first power conversion circuit 16 includes a first side 162 and a second side 164. The first side 162 of the first power conversion circuit 16 is coupled to the DC bus 14 and the second side 164 of the first power conversion circuit 16 is coupled to the power output path 12 through the first switch unit 20. The second power conversion circuit 18 includes a first side 182 and a second side 184. The first side 182 of the second power conversion circuit 18 is coupled to the DC bus 14 and the second side 184 of the second power conversion circuit 18 is coupled to the motor generator 200.

The DC bus 14 may have a storage capacitor C for storing electricity energy with a bus voltage Vbus. The bus voltage Vbus is selectively supplied to the first power conversion circuit 16 or the second power conversion circuit 18 according to the operation modes of the generator control system 10. The first switch unit 20 is disposed between the first power conversion circuit 16 and the power output path 12 for connecting or disconnecting the first power conversion circuit 16 to the AC output port 400. A first end of the second switch unit 22 is coupled to the first power conversion circuit 16 and the first switch unit 20, and a second end of the second switch unit 22 is coupled to the battery 300 through a DC port 10-1 for receiving a DC voltage Vdc provided by the battery 300. The second switch unit 22 is used to connect or disconnect the first power conversion circuit 16 to the battery 300. In particular, only one of the first switch unit 20 and the second switch unit 22 is turned on at a time during the operation in the start mode or a power generation mode of the generator control system 10 so as to avoid conflicts between the DC power of the battery 300 and the AC power of the AC output port 400 due to their different voltage properties.

The control unit 30 is coupled to the first power conversion circuit 16, the second power conversion circuit 18, the first switch unit 20, and the second switch unit 22. The control unit 30 provides a first control signal Sc1 to the first power conversion circuit 16 to control the first power conversion circuit 16, provides a second control signal Sc2 to the second power conversion circuit 18 to control the second power conversion circuit 18, provides a third control signal Sc3 to the first switch unit 20 to control the first switch unit 20, and provides a fourth control signal Sc4 to the second switch unit 22 to control the second switch unit 22. Each of the control signals Sc1-Sc4 is a collectively called signal, for example, the first power conversion circuit 16 has four switches Q1-Q4, and the four switches Q1-Q4 are controlled by the first control signal Sc1 including four corresponding control signals, that is, the four control signals are collectively called as the first control signal Sc1, so on and so forth. The generator control system further includes an auxiliary winding 32. The auxiliary winding 32 is coupled to the control unit 30 and is used to sense a back EMF (back electromotive force) BEMF of the motor generator 200, and the back EMF is used to control the operations of generator control system 10.

In the start mode, the first control signal Sc1 is used to control the first power conversion circuit 16 to convert the DC voltage Vdc into the bus voltage Vbus, and the energy with the bus voltage Vbus is stored in the storage capacitor C. The second control signal Sc2 is used to control the second power conversion circuit 18 to convert the bus voltage Vbus into the second AC voltage Vac2, and the second AC voltage Vac2 is used to drive the motor generator 200. In the power generation mode, reversely, the second control signal Sc2 is used to control the second power conversion circuit 18 to convert the second AC voltage Vac2 into the bus voltage Vbus, and the energy with the bus voltage Vbus is stored in the storage capacitor C. The first control signal Sc1 is used to control the first power conversion circuit 16 to convert the bus voltage Vbus into the first AC voltage Vac1, and the first AC voltage Vac1 is provided to the AC output port 400 through the first switch unit 20 and the power output path 12.

The third control signal Sc3 is used to turn on or turn off the first switch unit 20, and the fourth control signal Sc4 is used to turn on or turn off the second switch unit 22. In the start mode, the battery 300 is used to supply power to the motor generator 200 as a power source for starting the motor generator 200. Furthermore, since the engine 202 has not been started yet at this stage, the motor generator 200 cannot supply the first AC voltage Vac1 to the generator control system 10 stably and reliably. Therefore, in the start mode, the control unit 30 turns off the first switch unit 20 through the third control signal Sc3 and turns on the second switch unit 22 through the fourth control signal Sc4 so that the DC voltage Vdc provided by the battery 300 will not be transmitted to the load 402 and is converted into the second AC voltage Vac2 by the first power conversion circuit 16 and the second power conversion circuit 18 to drive the motor generator 200.

In the power generation mode, since the engine 202 has been started, the motor generator 200 can be driven by the engine 202 to generate the second AC voltage Vac2 and the DC voltage Vdc from the battery 300 is not needed anymore. In this condition, the control unit 30 turns on the first switch unit 20 through the third control signal Sc3 and turns off the second switch unit 22 through the fourth control signal Sc4, so that the first AC voltage Vac1 converted from the second AC voltage Vac2 is supplied to the AC output port 400.

As shown in FIG. 1, since the traditional ISG system usually needs to provide larger power to stabilize the speed of the motor generator 200 to successfully start the engine 202 and make the engine 202 run in high speed, the battery 300 may be a high-voltage battery (for example but not limited to 48 volts), and may be coupled to the storage energy C to directly supplement the consumption of the bus voltage Vbus. Since the battery 300 is a high-voltage battery, the switch for connecting or disconnecting the battery 300 to the generator control system 10 must be a relay with a relatively higher voltage rating. In the present disclosure, however, there is no need to use a high-voltage battery shown in FIG. 1 since the generator control system 10 uses the existing first power conversion circuit 16 to boost the DC voltage Vdc provided by the battery 300. In other words, low-voltage battery (such as 12 volts) with relatively smaller size can be used as the battery 300 in the present disclosure. Since the battery 300 is a low-voltage battery, the second switch unit 22 for connecting or disconnecting battery 300 to the generator control system 10 may be a switch with a relatively lower voltage rating, for example but not limited to a bidirectional transistor switch. Accordingly, the size of the generator control system 10 can be significantly reduced since the smaller-sized low-voltage battery 300 is used and the relay is replaced with the bidirectional transistor switch. However, since the first AC voltage Vac1 provided by the first power conversion circuit 16 is relatively high-voltage, the first switch unit 20 still needs to be a relay with a relatively higher voltage rating.

As shown in FIG. 2, the generator control system 10 may further include a converter 10-2. The converter 10-2 is coupled to the battery 300, the internal power sources of generator control system 10, and the control unit 30. The converter 10-2 is used to convert the DC voltage Vdc provided by the battery 300 into the voltage required for the operation of the control unit 30. Specifically, since the generator control system 10 cannot stably supply power to the control unit 30 during the process of the start mode, the control unit 30 needs an alternative power source to be able to operate and control the generator control system 10 in the start mode. The power required for the operation of the control unit 30 may be provided by the converter 10-2 through converting the DC voltage Vdc, or be supplied by an external power supply apparatus. After the engine 202 is started, the generator control system 10 is capable of providing stable power to the control unit 30 without the need of the battery 300, and therefore the converter 10-2 may convert the bus voltage Vbus or a voltage from the auxiliary winding 32 to supply power to the control unit 30. In one embodiment, the battery 300 can be replaced with an external power supply apparatus, that is, as long as the apparatus can stably supply the DC voltage Vdc stably, it should be embraced within the scope of the present disclosure.

Please refer to FIG. 2 again. The first power conversion circuit 16 may be a full-bridge inverter, which includes a first bridge arm 166, a second bridge arm 168, and a filter unit 170. The first bridge arm 166 is connected in parallel with the storage capacitor C of the DC bus 14 and includes a first switch Q1 and a second switch Q2 connected in series. The second bridge arm 168 is connected in parallel with the first bridge arm 166 and includes a third switch Q3 and a fourth switch Q4 connected in series. The filter unit 170 is coupled to the first bridge arm 166, the second bridge arm 168 and the first switch unit 20, and the filter unit 170 includes a first inductor L1, a second inductor L2, and an output capacitor Co. Specifically, a first end of the first inductor L1 is coupled to a junction point of the first switch Q1 and the second switch Q2, and a first end of the second inductor L2 is coupled to a junction point of the third switch Q3 and the fourth switch Q4. The first inductor L1 and the second inductor L2 are inductively coupled to form a coupling inductor so that a current flowing through the first bridge arm 166 may be substantially equal to a current flowing through the second bridge arm 168. A first end of the output capacitor Co is coupled to a second end of the first inductor L1 and a first end of a first side of the first switch unit 20, and a second end of the output capacitor Co is coupled to a second end of the second inductor L2 and a second end of the first side of the first switch unit 20.

In particular, a first conversion unit is composed of the first switch Q1, the second switch Q2, and the first inductor L1, and a second conversion unit is composed of the third switch Q3, the fourth switch Q4, and the second inductor L2. In the start mode, the control unit 30 provides the first control signal Sc1 to the first conversion unit to control the switching of the first switch Q1 and the second switch Q2 to work with the first inductor L1 as a boost conversion circuit, so as to convert the DC voltage Vdc into the bus voltage Vbus. Alternatively, the control unit 30 provides the first control signal Sc1 to the second conversion unit to control the switching of the third switch Q3 and the fourth switch Q4 to work with the second inductor L2, so as to convert the DC voltage Vdc into the bus voltage Vbus. In the power generation mode, the control unit 30 provides the first control signal Sc1 to control the first bridge arm 166 and the second bridge arm 168 to work as an inverter circuit to convert the bus voltage Vbus into the first AC voltage Vac1. In one embodiment, the filter unit 170 may be a full-bridge inverter having only a single inductor. When the filter unit 170 has only a single inductor, the DC voltage Vdc only be stepped up (boosted) to the bus voltage Vbus through the single inductor.

Please refer to FIG. 2 again. The second power conversion circuit 18 may be a three-phase inverter, which includes a third bridge arm 190, a fourth bridge arm 192, and a fifth bridge arm 194. The third bridge arm 190 is connected in parallel with the storage capacitor C of the DC bus 14 and includes a fifth switch Q5 and a sixth switch Q6 connected in series. The fourth bridge arm 192 is connected in parallel with the third bridge arm 190 and includes a seventh switch Q7 and an eighth switch Q8 in series. The fifth bridge arm 194 is connected in parallel with the fourth bridge arm 192 and includes a ninth switch Q9 and a tenth switch Q10 connected in series. The switches Q5-Q10 are corresponding coupled to the three phases of the motor generator 200 for providing the three-phase second AC voltage Vac2. In the start mode, the control unit 30 controls the switching of the switches Q5-Q10 of the third bridge arm 190, the fourth bridge arm 192, and the fifth bridge arm 194 so as to convert the bus voltage Vbus into the second AC voltage Vac2. In the power generation mode, the control unit 30 controls the switching of the switches Q5-Q10 of the third bridge arm 190, the fourth bridge arm 192, and the fifth bridge arm 194 so as to convert the second AC voltage Vac2 into the bus voltage Vbus.

In one embodiment, the generator control system 10 may be a control system without a position sensor or with a position sensor, such as a Hall sensor. In the case of the control architecture without a position sensor (sensorless), the position, angle, and speed of the motor generator 200 may be acquired by detecting the back EMF BEMF of the motor generator 200, the second AC voltage Vac2, and/or the generator currents Iu, Iv, Iw and calculating the aforementioned parameters through a position sensorless algorithm, thereby saving the circuit cost of the Hall sensor and the sensor control design and reducing the circuit volume of the generator control system 10.

Figure 3A:
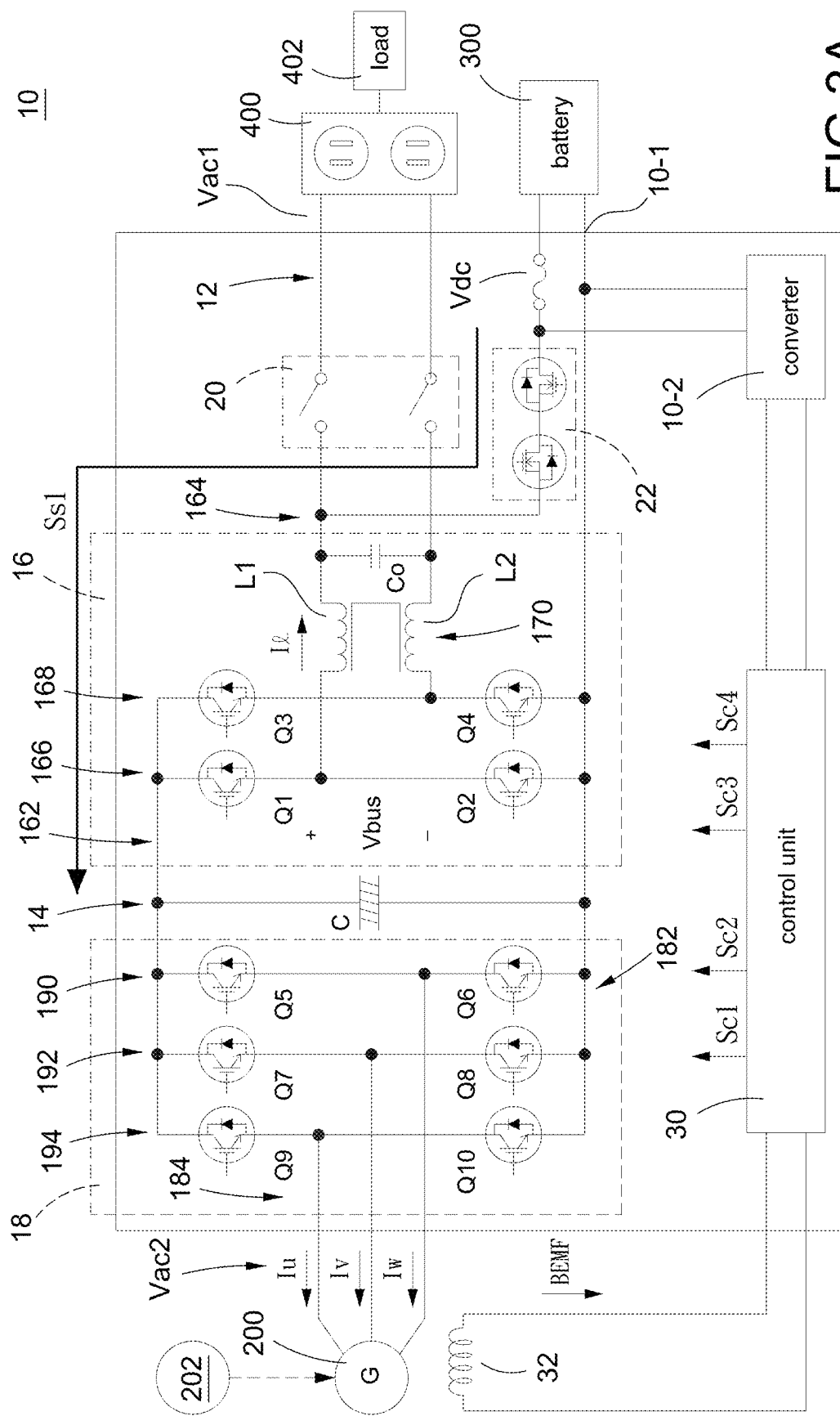
FIG. 3A is a circuit diagram of the exemplary generator control system of FIG. 2 indicating a first step of a start mode operation according to the present disclosure.
Figure 3B:
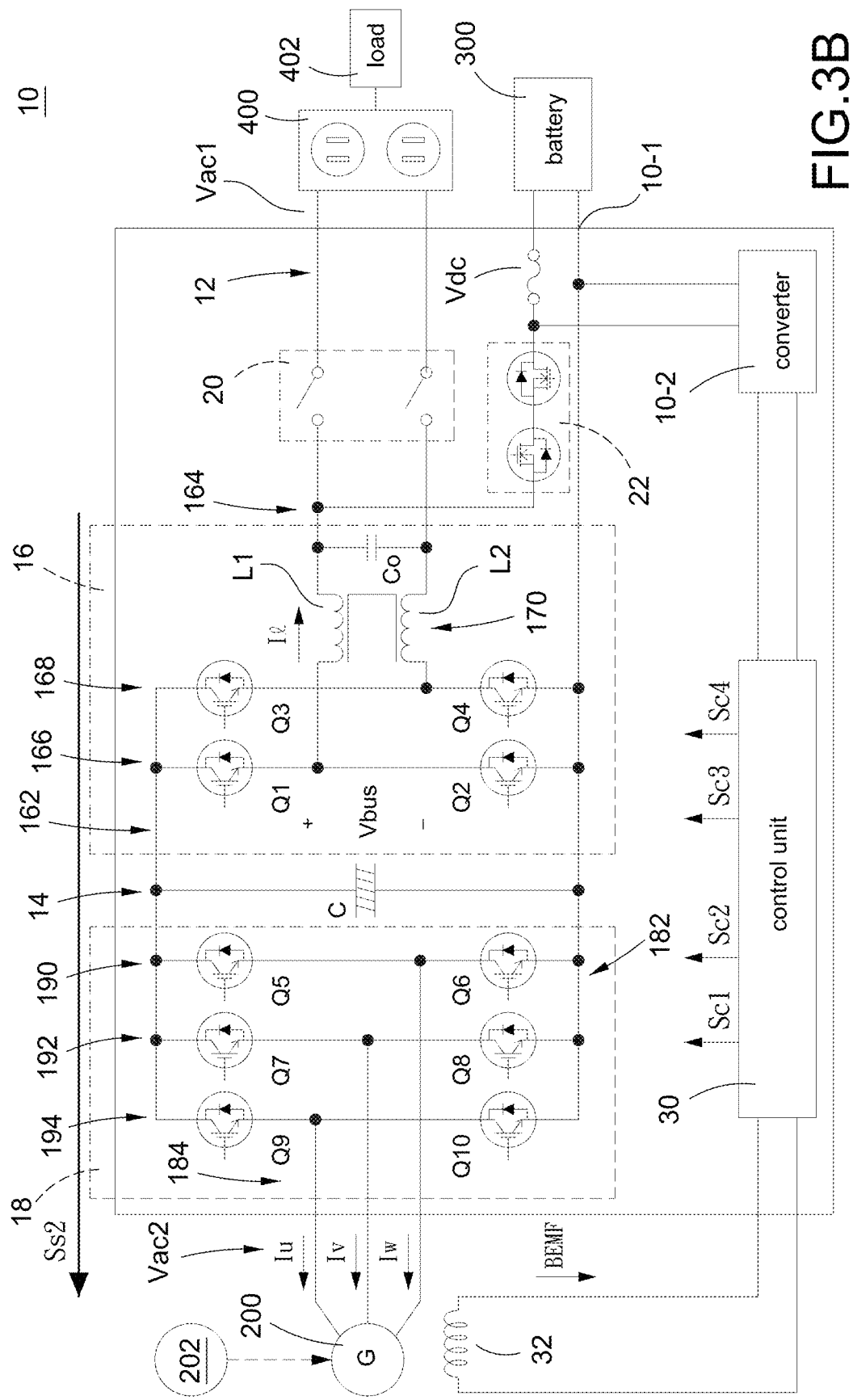
FIG. 3B is a circuit diagram of the exemplary generator control system of FIG. 2 indicating a second step of the start mode operation according to the present disclosure.

FIG. 3A and FIG. 3B illustrate circuit diagrams of the exemplary generator control system of FIG. 2 indicating a first step and a second step of a start mode operation according to the present disclosure, respectively, and please also refer to FIG. 2. Before the generator control system 10 successfully starts the engine 202, the control unit 30 turns off the first switch unit 20 and turns on the second switch unit 22. When the second switch unit 22 is turned on, the control unit 30 forcibly turns off the first switch unit 20 to avoid the risk of simultaneously turning on the first switch unit 20 and the second switch unit 22. Therefore, in the start mode, a power start path of the generator control system 10 is formed from the DC port 10-1, the second switch unit 22, the first power conversion circuit 16, the DC bus 14, the second power conversion circuit 18 to the motor generator 200.

In a first step Ss1 of the start mode shown in FIG. 3A, the control unit 30 first detects the bus voltage Vbus. Since the bus voltage Vbus has not been established before the engine 202 is started, the bus voltage Vbus is less than or equal to a predetermined voltage value, for example but not limited to 48 volts. When the control unit 30 detects that the bus voltage Vbus is less than or equal to the predetermined voltage value, the control unit 30 provides the third control signal Sc3 to turn off the first switch unit 20 and provides the fourth control signal Sc4 to turn on the second switch unit 22. In this condition, the electricity energy with DC voltage Vdc stored in the battery 300 is provided to the first power conversion circuit 16 through the second switch unit 22.

Afterward, the control unit 30 provides the first control signal Sc1 to control the switching of the first switch Q1 and the second switch Q2 to work with the first inductor L1 as a boost conversion circuit, so as to convert the DC voltage Vdc into the bus voltage Vbus through the first conversion unit (composed of the first switch Q1, the second switch Q2, and the first inductor L1). Alternatively, the control unit 30 provides the first control signal Sc1 to control the switching of the third switch Q3 and the fourth switch Q4 to work with the second inductor L2 as a boost conversion circuit, so as to convert the DC voltage Vdc into the bus voltage Vbus through the second conversion unit (composed of the third switch Q3, the fourth switch Q4, and the second inductor L2). During the process that the DC voltage Vdc is converted to the bus voltage Vbus by the first power conversion circuit 16, the control unit 30 continuously detects at least the bus voltage Vbus and an inductor current I1 flowing through the filter unit 170 so as to adjust a duty cycle of the first control signal Sc1, thereby adjusting and stabilizing the bus voltage Vbus.

In one embodiment, the control unit 30 can further detect a current flowing through the DC bus 14 to determine how to control the first switch unit 20 and the second switch unit 22. When the control unit 30 detects a bus current in a first direction, the control unit 30 turns off the first switch unit 20, wherein the first direction is the direction in which the bus current flows from the first power conversion circuit 16 to the second power conversion circuit 18. In this manner, the current provided by the battery 300 will be prevented from flowing to the load 402 through the first switch unit 20, thereby avoiding damages to the load 402, or, when a plurality of motor generators 200 are connected in parallel, the output current of one of the motor generators 200 will be prevented from flowing to the batteries 300 of other motor generators 200 through the parallel AC output ports 400, thereby avoiding damages to the batteries 300. Accordingly, it is ensured that the current provided by the battery 300 only flows from the first power conversion circuit 16 to the second power conversion circuit 18, and no external current flows to the battery 300 from the AC output port 400. Moreover, when the control unit 30 detects the bus current with a second direction, the control unit 30 turns off the second switch unit 22, wherein the second direction is the direction in which the bus current flows from the second power conversion circuit 18 to the first power conversion circuit 16, that is, the second direction is opposite to the first direction. Therefore, the current flowing from the motor generator 200 is prevented from flowing to the battery 300 through the second switch unit 22, thereby avoiding damages to the battery 300.

In a second step Ss2 of the start mode shown in FIG. 3B, when the control unit 30 detects that the bus voltage Vbus is substantially equal to the predetermined voltage value (i.e. 48 volts), the control unit 30 provides the second control signal Sc2 to control the switching of the switches Q5-Q10 so as to convert the bus voltage Vbus into the second AC voltage Vac2. During the process that the bus voltage Vbus is converted to the second AC voltage Vac2 by the second power conversion circuit 18, the control unit 30 continuously detects at least the bus voltage Vbus and generator currents Iu, Iv, Iw so as to adjust a duty cycle of the second control signal Sc2, thereby adjusting and stabilizing the second AC voltage Vac2 and generator currents Iu, Iv, Iw. Moreover, the control unit 30 detects and calculates the second AC voltage Vac2, the generator currents Iu, Iv, Iw, and the back EMF (back electromotive force) BEMF to acquire a generator speed of the motor generator 200. The control unit 30 further adjusts a duty cycle of the second control signal Sc2 to control the generator speed of the motor generator 200 at a predetermined speed, for example but not limited to 400 rpm, to make the engine 202 successfully start. After the engine 202 is successfully started, the generator speed of the motor generator 200 will begin to increase to approach a second threshold value (for example but not limited to 1000 rpm) that represents the completion of the start procedure of the engine 202.

Figure 4A:
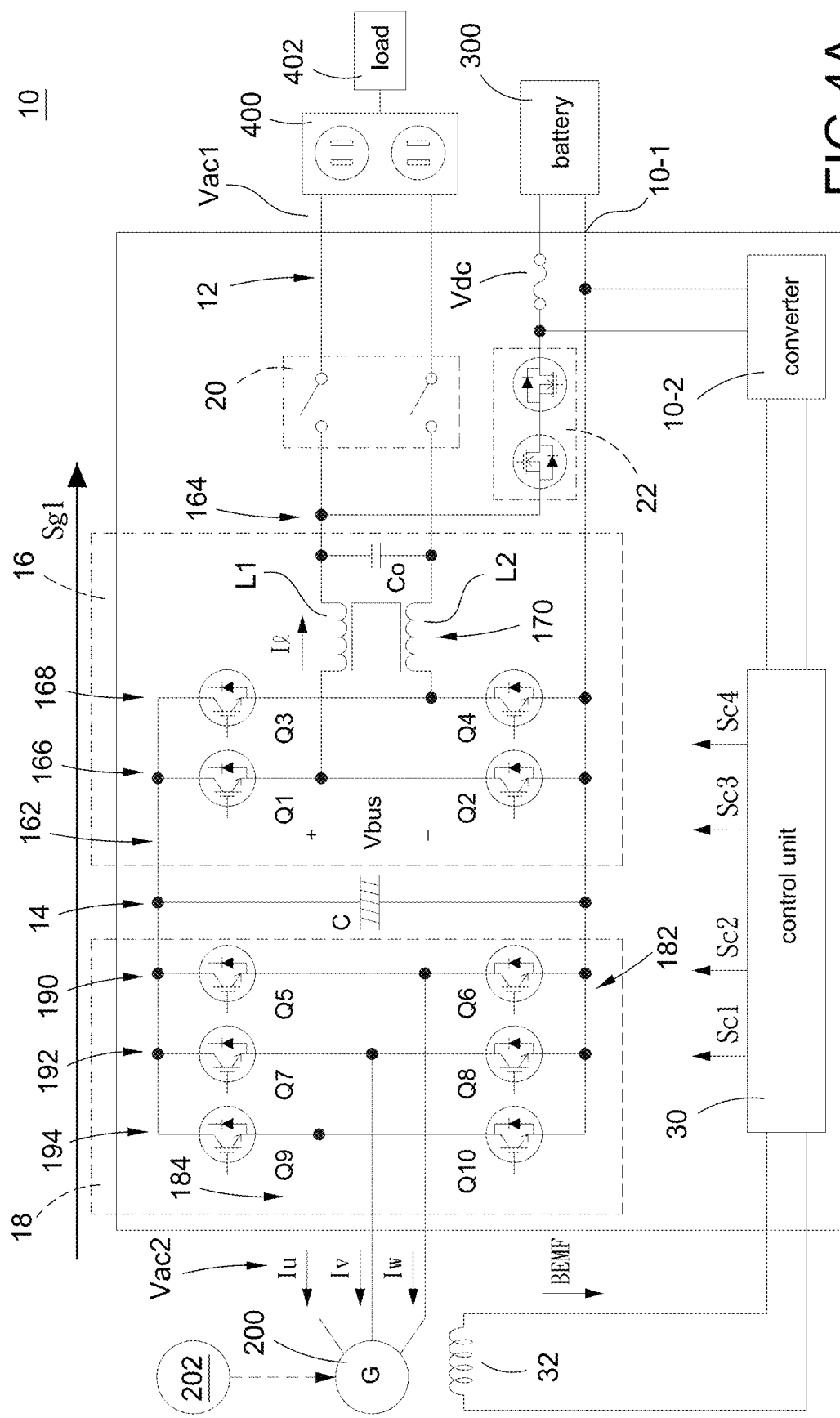
FIG. 4A is a circuit diagram of the exemplary generator control system of FIG. 2 indicating a first step of a power generation mode operation according to the present disclosure.
Figure 4B:
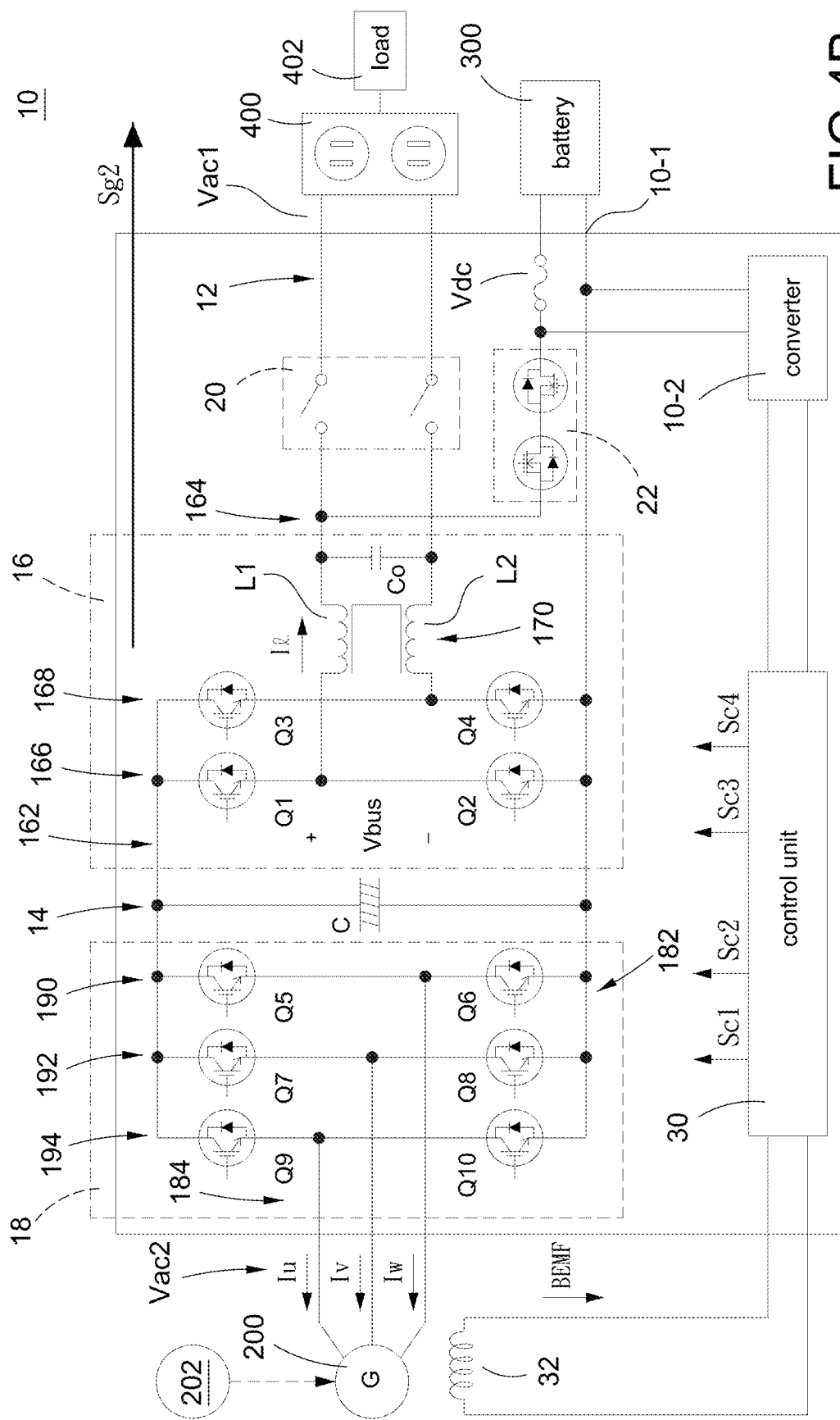
FIG. 4B is a circuit diagram of the exemplary generator control system of FIG. 0.2 indicating a second step of the power generation mode operation according to the present disclosure.

FIG. 4A and FIG. 4B illustrate circuit diagrams of the exemplary generator control system of FIG. 2 indicating a first step and a second step of a power generation mode operation according to the present disclosure, respectively, and please also refer to FIG. 2 to FIG. 3B. After the engine 202 is successfully started by the generator control system 10, the control unit 30 does not immediately turn on the first switch unit 20 and turn off the second switch unit 22. The reason is that the control unit 30 must ensure that the engine 202 is able to normally operate so as to avoid the risk of failure of the generator control system 10 caused by unstable operation of the engine 202.

In a first step Sg1 of the power generation mode shown in FIG. 4A, the control unit 30 continuously detects the generator speed of the motor generator 200 and the bus voltage Vbus. When the bus voltage Vbus is greater than a first threshold value, for example but not limited to 80 volts, or the generator speed of the motor generator 200 is greater than a second threshold value, for example but not limited to 1000 rpm, it means that the engine 202 has been successfully started and the motor generator 200 is able to provide power back to the generator control system 10. Since the generator control system 10 of the present disclosure does not use a Hall sensor to detect the rotor position of the motor generator 200, the generator speed of the motor generator 200 is acquired by first detecting the generator currents Iu, Iv, Iw and the bus voltage Vbus by the control unit 30 and then calculating the aforementioned parameters through a position sensorless algorithm provided by the control unit 30. Alternatively, the generator speed may be acquired by detecting a back EMF BEMF of the motor generator 200 in operation through an auxiliary winding 32 and then calculating the back EMF BEMF.

When the engine 202 is successfully started, the control unit 30 provides the first control signal Sc1 to control the first power conversion circuit 16 to stop converting the DC voltage Vdc into the bus voltage Vbus. Also, the control unit 30 provides the third control signal Sc3 to turn on the first switch unit 20 and provides the fourth control signal Sc4 to turn off the second switch unit 22, thereby beginning the operation of the power generation mode. Afterward, the control unit 30 provides the second control signal Sc2 to control the switching of the switches Q5-Q10 so as to convert the second AC voltage Vac2 into the bus voltage Vbus. During the process that the second AC voltage Vac2 is converted to the bus voltage Vbus by the second power conversion circuit 18, the control unit 30 continuously detects at least the generator currents Iu, Iv, Iw and the back EMF BEMF (or uses the algorithm of position sensorless) so as to adjust the duty cycle of the second control signal Sc2, thereby adjusting and stabilizing the bus voltage Vbus.

In a second step Sg2 of the power generation mode shown in FIG. 4B, the control unit 30 provides the first control signal Sc1 to control the switching of the first bridge arm 166 and the second bridge arm 168 to work as an inverter so as to convert the bus voltage Vbus into the first AC voltage Vac1, and the first AC voltage Vac1 is provided to the first switch unit 20. During the process that the bus voltage Vbus is converted to the first AC voltage Vac1 by the first power conversion circuit 16, the control unit 30 continuously detects at least the bus voltage Vbus and the inductor current I1 flowing through the filter unit 170 so as to adjust the duty cycle of the first control signal Sc1, thereby adjusting and stabilizing the first AC voltage Vac1. Therefore, in the power generation mode after starting the engine 202, a power supply path of the generator control system 10 is formed from the motor generator 200, the second power conversion circuit 18, the DC bus 14, the first power conversion circuit 16, the first switch unit 20 to the power output path 12.

In conclusion, the present disclosure has following features and advantages:

1. A more effective way for starting the engine: The battery, the existing DC-to-AC conversion circuit (the first power conversion circuit 16) and AC-to-DC conversion unit (the second power conversion circuit 18) are used to convert the DC voltage of the battery into the AC voltage to the motor generator, so as to more effectively drive the engine to the proper speed to be successfully started than the traditional hand-pulling started generator systems.

2. Less modification efforts for mass-produced generator systems: The bus voltage of the three-phase full-bridge circuit of this system architecture can be flexibly adjusted to match the specifications of existing generator systems, so the existing mass-produced generator system does not need any modification or just need slight modification.

3. More stable engine ignition speed: Since the bus voltage can be appropriately adjusted to 48 volts or 64 volts, the engine ignition speed can be more stable and higher.

4. Lower cost: Although additional switches are required, the battery used in the generator control system of the present disclosure can be a low-cost 12-volt lead-acid battery. Furthermore, the existing generator circuit architecture can be directly used for starting the engine and supplying power without too much modification, thus the overall cost is relatively low.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A generator control system coupled to a motor generator, the generator control system comprising:
   a DC port configured to receive a DC voltage,
   a first switch unit,
   a DC bus,
   a first power conversion circuit having a first side coupled to the DC bus and a second side coupled to the first switch unit,
   a second power conversion circuit having a first side coupled to the DC bus and a second side coupled to the motor generator, and
   a second switch unit,
   wherein a first end of the second switch unit is coupled to the first power conversion circuit and the first switch unit, and a second end of the second switch unit is coupled to the DC port.

2. The generator control system of claim 1, further comprising:
   a control unit coupled to the first power conversion circuit, and configured to provide a first control signal to control the first power conversion circuit to convert the DC voltage into a bus voltage on the DC bus, or provide the first control signal to control the first power conversion circuit to convert the bus voltage into a first AC voltage, and the first AC voltage is provided to the first switch unit.

3. The generator control system of claim 2, wherein a storage capacitor is couple between a positive bus and a negative bus of the DC bus, and the first power conversion circuit comprises:
 a first bridge arm connected with the storage capacitor in parallel and having a first switch and a second switch connected in series,
 a second bridge arm connected with the first bridge arm in parallel and having a third switch and a fourth switch connected in series, and
 a filter unit coupled to the first bridge arm, the second bridge arm and the first switch unit,
 wherein the control unit controls the first bridge arm or the second bridge arm to convert the DC voltage into the bus voltage, and controls the first bridge arm and the second bridge arm to convert the bus voltage into the first AC voltage.

4. The generator control system of claim 3, wherein the filter unit comprises:
 a first inductor, a first end of the first inductor coupled to a junction point of the first switch and the second switch, a second end of the first inductor coupled to the first switch unit,
 a second inductor inductively coupled with the first inductor, a first end of the second inductor coupled to a junction point of the third switch and the fourth switch, a second end of the second inductor coupled to the first switch unit, and
 an output capacitor coupled between the second end of the first inductor and the second end of the second inductor,
 wherein a first conversion unit is composed of the first switch, the second switch, and the first inductor, and a second conversion unit is composed of the third switch, the fourth switch, and the second inductor; the control unit controls the first conversion unit or the second conversion unit to convert the DC voltage into the bus voltage.

5. The generator control system of claim 2, wherein the control unit is further coupled to the second power conversion circuit, and the control unit provides a second control signal to control the second power conversion circuit to bidirectionally convert the bus voltage and a second AC voltage.

6. The generator control system of claim 5, wherein the second power conversion circuit comprises:
 a third bridge arm connected to the DC bus in parallel, and having a fifth switch and a sixth switch connected to the fifth switch in series,
 a fourth bridge arm connected to the third bridge arm in parallel, and having a seventh switch and an eighth switch connected to the seventh switch in series, and
 a fifth bridge arm connected to the fourth bridge arm in parallel, and having a ninth switch and a tenth switch connected to the ninth switch in series,
 wherein the third bridge arm, the fourth bridge arm, and the fifth bridge arm are coupled to the motor generator; the control unit controls the third bridge arm, the fourth bridge arm, and the fifth bridge arm to bidirectionally convert the bus voltage and the second AC voltage.

7. The generator control system of claim 2, wherein the control unit is further coupled to the first switch unit and the second switch unit, and the control unit determines to control the first switch unit and the second switch unit by detecting the bus voltage and a generator speed of the motor generator; when the bus voltage is less than or equal to a first threshold value, the control units turns off the first switch unit and turns on the second switch unit; when the bus voltage is greater than the first threshold value or the generator speed is greater than a second threshold value, the control unit turns on the first switch unit and turns off the second switch unit.

8. The generator control system of claim 2, wherein the control unit is further coupled to the first switch unit and the second switch unit; when the control unit detects a bus current in a first direction, the control unit turns off the first switch unit, and when the control unit detects the bus current in a second direction, the control unit turns off the second switch unit; wherein the first direction is a direction in which the bus current flows from the first power conversion circuit to the second power conversion circuit, and the second direction is opposite to the first direction.

9. The generator control system of claim 1, wherein the first switch unit is a relay and the second switch unit is a bidirectional transistor switch.

10. A method of controlling a generator control system couple to a motor generator, the generator control system comprising a DC port for receiving a DC voltage, a first switch unit, a DC bus, a first power conversion circuit, a second power conversion circuit, and a second switch unit, the method comprising steps of:
 (a) turning off the first switch unit and turning on the second switch unit when a bus voltage of the DC bus is less than or equal to a first threshold value,
 (b) controlling a first bridge arm or a second bridge arm of the first power conversion circuit to convert the DC voltage into the bus voltage, and
 (c) controlling the second power conversion circuit to convert the bus voltage into a second AC voltage to drive the motor generator.

11. The method of claim 10, further comprising steps of:
 (d) turning off the second switch unit and then turning on the first switch unit when the bus voltage is greater than the first threshold value or a generator speed of the motor generator is greater than a second threshold value,
 (e) controlling the second power conversion circuit to convert the second AC voltage into the bus voltage, and
 (f) controlling the first bridge arm and the second bridge arm to convert the bus voltage into a first AC voltage and providing the first AC voltage to the first switch unit.

12. The method of claim 10, wherein the step (c) further comprises a step of:
 (c1) controlling a third bridge arm, a fourth bridge arm and a fifth bridge arm of the second power conversion circuit that are connected in parallel to adjust a generator speed of the motor generator to a predetermined speed so that an engine connected to the motor generator is started to increase the generator speed to be greater than a second threshold value.

13. The method of claim 10, further comprising steps of:
 (g1) turning off the first switch unit when a bus current in a first direction is detected, wherein the first direction is a direction in which the bus current flows from the first power conversion circuit to the second power conversion circuit, and (g2) turning off the second switch unit when the bus current in a second direction is detected, wherein the second direction is opposite to the first direction.

14. The method of claim 11, wherein the generator speed is acquired by calculating the bus voltage and a generator current provided by the second power conversion circuit through a position sensorless algorithm.

15. The method of claim 11, wherein the generator speed is acquired by calculating a back electromotive force of the motor generator.

* * * * *